United States Patent [19]
Yamaguchi

[11] Patent Number: 5,101,441
[45] Date of Patent: Mar. 31, 1992

[54] METHOD OF AND DEVICE FOR PROCESSING IMAGE

[75] Inventor: Masashi Yamaguchi, Iwata, Japan

[73] Assignee: Yamaha Hatsudoki K.K., Shizuoda, Japan

[21] Appl. No.: 410,176

[22] Filed: Sep. 20, 1989

[30] Foreign Application Priority Data

Sep. 21, 1988 [JP] Japan .............................. 63-234835

[51] Int. Cl.$^5$ .............................................. G06K 9/36
[52] U.S. Cl. ....................................... 382/30; 382/27; 382/43; 382/41
[58] Field of Search ...................... 382/27, 30, 43, 41; 340/146.2; 364/726, 725, 819

[56] References Cited

U.S. PATENT DOCUMENTS

| | | | |
|---|---|---|---|
| 4,254,399 | 3/1981 | Burkhardt et al. | 382/41 |
| 4,817,176 | 7/1984 | Marshall et al. | 382/30 |
| 4,899,127 | 2/1990 | Kawai et al. | 340/146.2 |

*Primary Examiner*—Michael Razavi
*Attorney, Agent, or Firm*—Sughrue, Mion, Zinn, Macpeak & Seas

[57] ABSTRACT

A method of and device for processing an image by the pattern matching process wherein an image matched with a templet image is determined. In principle, a mismatch degree between the image to be read and the templet image is found by effecting Hadamard transformation on both images and then comparing the images while making use of the Hadamard coefficients found by the transformation of the images. In one embodiment, the matching zone is defined as the zone in which the sum of the absolute values of the differences between the Hadamard coefficients derived from the templet image and the Hadamard coefficients derived from the image to be read takes a minimum value. In another embodiment, differences in Hadamard coefficients of the templet image from those of the image zones each taking the maximum value for each block are added, and then the thus added sum is compared with a pre-set threshold value to determine that the both images, i.e. the image to be read and the corresponding templet image, are mismatched when the added sum is larger than the pre-set threshold value.

4 Claims, 5 Drawing Sheets

| $t_1$ | $t_2$ | $t_3$ | $t_4$ |
|---|---|---|---|
| $t_5$ | $t_6$ | $t_7$ | $t_8$ |
| $t_9$ | $t_{10}$ | $t_{11}$ | $t_{12}$ |
| $t_{13}$ | $t_{14}$ | $t_{15}$ | $t_{16}$ |

(4×4, circled at $t_1$)

Templet Image t

| $t_1'$ | $t_2'$ | $t_3'$ | $t_4'$ |
|---|---|---|---|
| $t_5'$ | $t_6'$ | $t_7'$ | $t_8'$ |
| $t_9'$ | $t_{10}'$ | $t_{11}'$ | $t_{12}'$ |
| $t_{13}'$ | $t_{14}'$ | $t_{15}'$ | $t_{16}'$ |

Templet Image t'
(Characteristic Templet T')

Image h

METHOD OF AND DEVICE FOR PROCESSING IMAGE

BACKGROUND OF THE INVENTION

1. Field of the Invention

The present invention relates to a method of and device for processing an image by the pattern matching process wherein an image matched with a templet image is determined.

2. Related Art Statement

In the field of image processing technology, one of the widely known methods is the so-called pattern matching method in which a predetermined image (commonly referred to as "templet image" and this term will be used throughout the specification and claims) is searched from the image zones to be read and used during the following processing sequence. In this method, a certain zone extracted from the image to be read and a templet image are, respectively, partitioned into plural picture elements from which the differences in density of the corresponding picture elements are found, and the sum of the absolute values of the differences for respective picture elements is used as the means for determining the mismatch degree, the zone giving the minimum sum of differences being defined as the matching zone. However, this known method has a disadvantage in that the accuracy thereof becomes inferior when the illumination condition is fluctuated, which affects the accuracy of the measurement operation directly.

In order to overcome the aforementioned disadvantage caused by the fluctuation of the illumination condition. A method has been proposed wherein the interrelationship between the templet image and the image to be read is found and used as the means for determining the matching degree. However, the practice of this method of prior proposal has another disadvantage in that $N^2$ time multiplication operations and $(N^2-1)$ time addition operations are required when the number of picture elements in a certain image zone to be read is $N \times N$, and that similar operations must be repeated as the image zone to be read is shifted, leading to the result that enormous calculating operations are needed.

OBJECTS AND SUMMARY OF THE INVENTION

In view of the aforementioned circumstances, a first object of this invention is to provide a method of processing an image, by which the image processing is carried out at high speed by reducing the calculation operations considerably and which is not affected by the illumination condition.

A second object of this invention is to provide an image processing device which is used for the practice of the image processing method as described above.

The first object of this invention is achieved by the provision of an improved process in a pattern matching image processing method wherein a matching zone in which an image to be read is agreed with a templet image is searched and determined, the improved process being characterized in that a mismatch degree between the image to be read and the templet image is found by effecting Hadamard transformation of said both images and then comparing the images while making use of the Hadamard coefficients found by the transformation of said images.

In the image processing method according to this invention, the templet image and the image to be read are subjected to Hadamard transformation to factorize them into different frequency components forming a rectangular coordinates function, and then the D.C. components are removed not to be compared in the subsequent operation thereby to exclude the influence by the fluctuation of the illumination condition. On the other hand, the required calculation operations are remarkably reduced in number by using only one or plural Hadamard coefficients which are selected in the order from the maximum value among the Hadamard coefficients of the frequency components except the D.C. components.

In a preferred embodiment of the method of this invention, the matching image is defined as the image which gives the minimum sum of the absolute values of the difference in one or more Hadamard coefficients which are selected in the order from the maximum value except the D.C. components for the respective picture elements of each image to be read and of the corresponding templet image. It is also possible to add the differences in Hadamard coefficients each taking the maximum value for each block and then the thus added sum is compared with a pre-set threshold value to determine that the both images (i.e. the image to be read and the corresponding templet image) are mismatching when the added sum is larger than the pre-set threshold value.

The second object of this invention is achieved by the provision of an improved image processing device for processing an image through a pattern matching image processing method wherein a matching zone in which the image to be read is matched with a templet image is searched and determined, the improved device comprising:

a characteristic templet memory for memorizing the characteristic templet which has, as the element component, the frequency component giving the maximum absolute Hadamard coefficient value among the frequency components except the D.C. components;

a characteristic value memory for memorizing the Hadamard coefficient of said frequency component having the maximum absolute value as the characteristic value d;

Hadamard transformer means for transforming said image to be read using said characteristic templet;

an additional memory for memorizing the Hadamard coefficient transformed by said transformer means as the characteristic quantity d';

mismatch degree calculating means for calculating the mismatch degree $A = \epsilon |d - d'|$ by adding the absolute values of differences in characteristic values of the templet and of the image to be read; and comparator means for comparing said mismatch degree with a pre-set value to judge that the zone is a matching zone when said mismatch degree is not more than said pre-set value.

According to a preferred embodiment, there is provided an improved image processing device for processing an image through a pattern matching image processing method wherein a matching zone in which the image to be read is matched with a templet image is searched and determined, the improved device comprising:

a characteristic templet memory for memorizing the characteristic templet which has, as the element component, the frequency component giving the maximum absolute Hadamard coefficient value among the frequency components except the D.C. components;

a characteristic value memory for memorizing the Hadamard coefficient of said frequency component having the maximum absolute value as the characteristic value d and simultaneously memorizing at least the block giving the maximum absolute value;

Hadamard transformer means for transforming said image to be read using said characteristic templet;

calculator means for calculating and adding the absolute values of the differences in characteristic values of the templet and of the image to be read in the order from the block which takes the maximum characteristic value; and comparator means for comparing the sum obtained by said calculator with a pre-set threshold to judge that the image is mismatched when said sum is more than said pre-set threshold.

DESCRIPTION OF PREFERRED EMBODIMENTS

Referring to the appended drawings, preferred embodiments of this invention will be described in detail.

Figure 1:
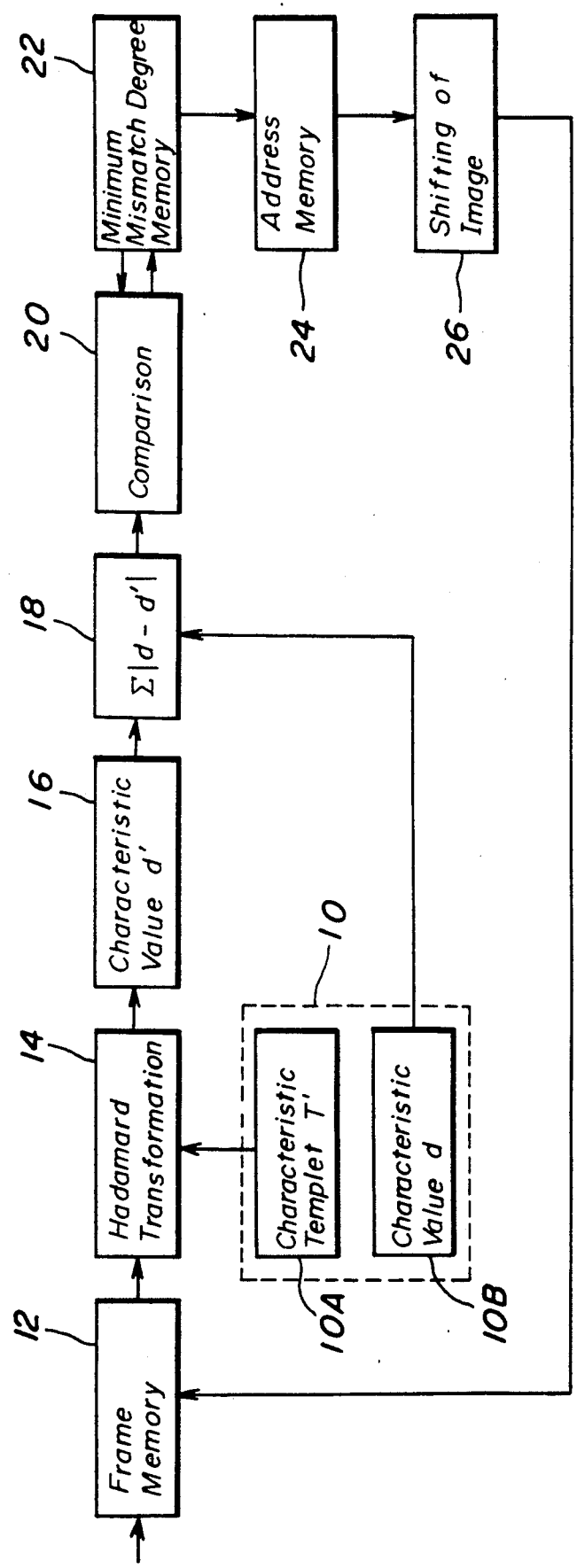
FIG. 1 ia a block diagram showing the function of one embodiment of the device according to this invention.

First referring to FIG. 1, reference numeral 10 designates a templet memory which memorize the characteristic templet T' and the characteristic value d derived from the templet image. The characteristic templet T' is obtained by subjecting the templet image to Hadamard transformation and finding the frequency component having the maximum absolute Hadamard coefficient value among all frequency components, except the D.C. components, which are in the rectangular coordinates relationship to define that the thus found frequency component is the element for each block. The characteristic value d is the Hadamard coefficient of the frequency component having the maximum absolute Hadamard value.

Figure 3:
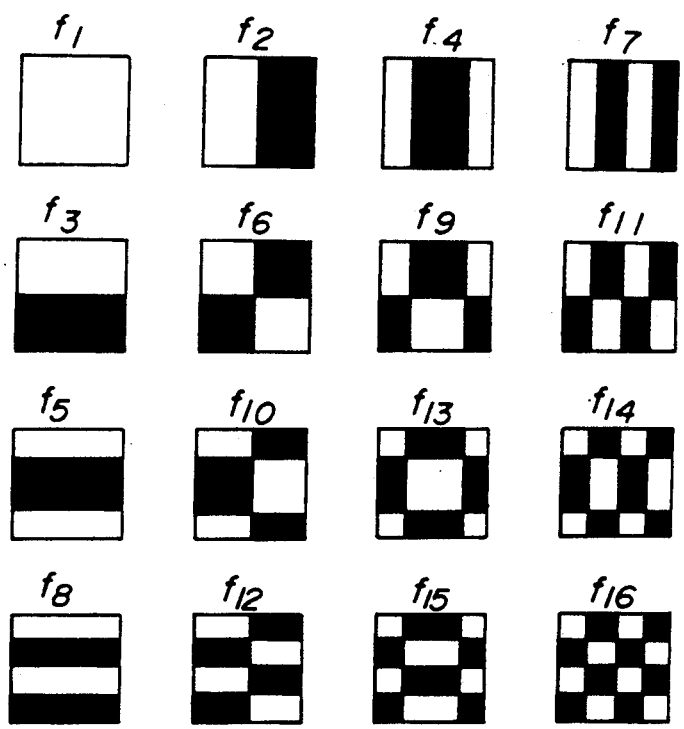
FIG. 3 shows various images which are obtained by the Hadamard transformation according to this invention.

For example, provided that a certain image g is composed of $4 \times 4$ picture elements, the image g may be expanded as represented by the following equation while using the frequency components shown by the Hadamard transformation image of FIG. 3:

$$g = a_1 f_1 + a_2 f_2 + \cdots + a_{16} f_{16}$$

The Hadamard coefficients in the equation may be given by the following equations:

$$a_1 = (1/16) g \cdot f_1$$
$$a_2 = (1/16) g \cdot f_2 \ldots$$

-continued
$$a_{16} = (1/16) g \cdot f_{16}$$

It is known that no significant degradation of image quality is resulted even if not all of the frequency components are used and it suffices to use eight components from those having larger Hadamard coefficients.

In the present invention, only using one or more largest coefficients among the coefficients $a_2$ to $a_{16}$ except the D.C. components ($f_1$) to find the mismatch degree of the images.

Figure 2:
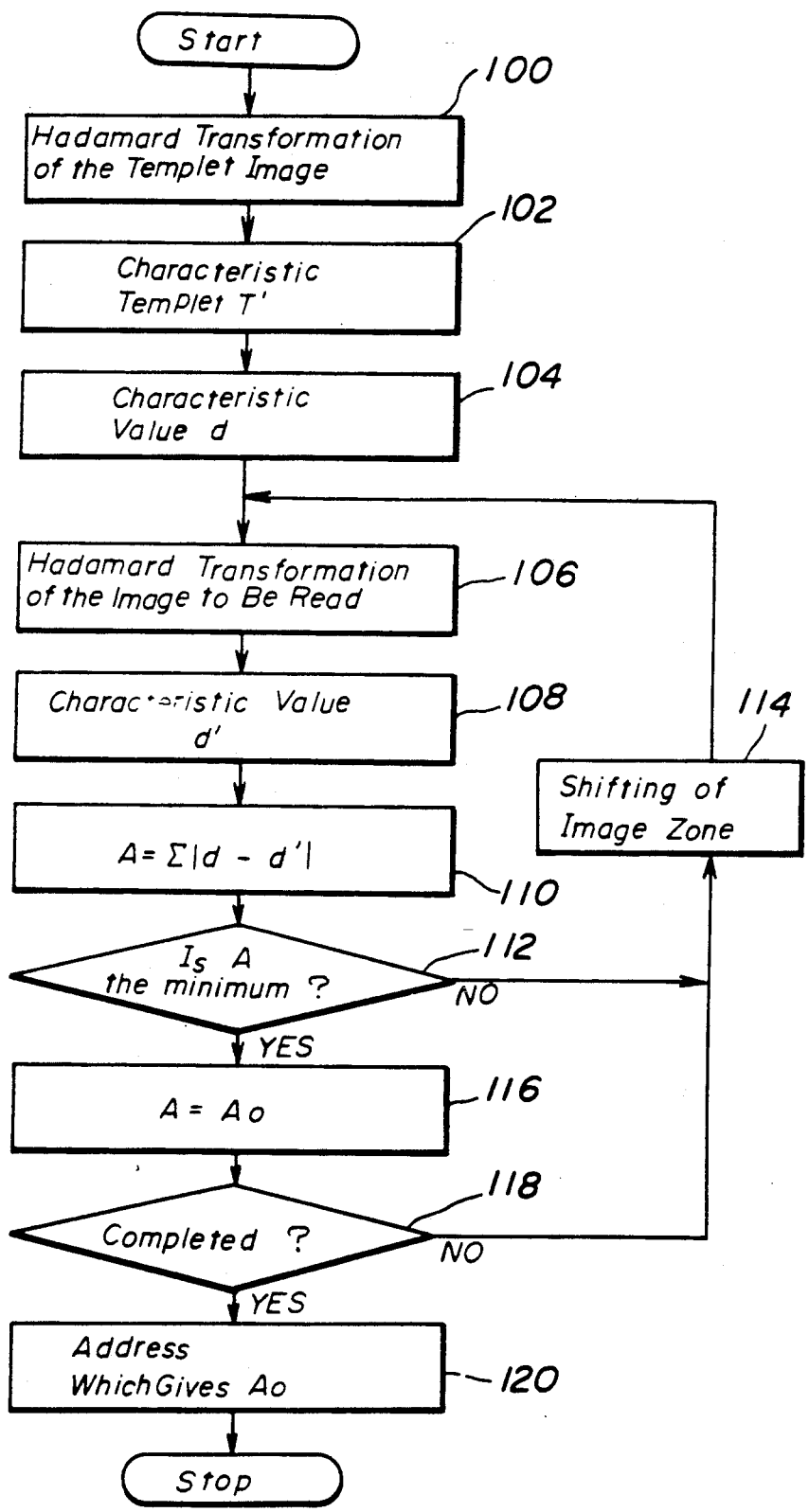
FIG. 2 is a flow chart showing the operation sequence of the method embodying the invention.
Figures 4A, 4B, 4C:
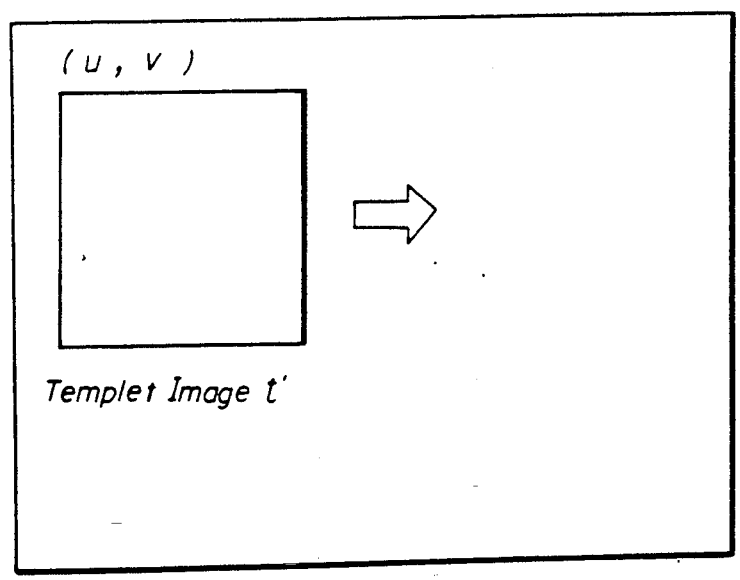
FIGS. 4A to 4C are diagramatical illustrations for elucidating the pattern matching processing.

For example, a templet image having an area containing $16 \times 16$ picture elements is partitioned into blocks of $4 \times 4$ picture elements as shown in FIG. 4A, and Hadamard transformation is effected for the block $t_1$ (Step 100 shown in FIG. 2) to find the maximum coefficient $a_n$ among the Hadamard coefficients $a_2$ to $a_{16}$. The block $t_1$ is represented by the frequency component $f_n$, which corresponds to the thus found coefficient $a_n$, so that it is defined as the templet image t' for the block $t_1$ and the coefficient $a_n$ is defined as the characteristic value $d_1$ for the block $t_1$.

Similarly, the templet images $t_2$ to $t_{16}$ and the characteristic values $d_2$ to $d_{16}$ are obtained for the other blocks $t_2$ to $t_{16}$. From the thus selected t', the characteristic templet T' shown in FIG. 4B is obtained, and the thus obtained characteristic templet T' is memorized in the characteristic templet memory 10A of the memory 10 together with the characteristic value d which is memorized in the characteristic value memory 10B of the memory 10 (Steps 102 and 104 shown in FIG. 2).

Referring back to FIG. 1, reference numeral 12 designates a frame memory, and reference numeral 14 designates an Hadamard transformation means. The image h to be read is shown in FIG. 4C and read by an image sensor (not shown) or like means, followed by A/D conversion, to be temporarily memorized in the frame memory 12. Using the characteristic templet T', the image h is subjected to Hadamard transformation (Step 106). In detail, Hadamard transformation is effected for a position (u, v) within the image h to find the Hadamard coefficient for the same frequency component as the corresponding block of the characteristic templet T', so that the thus found coefficient is defined as the characteristic value d' for each block of the position (u, v) (Step 108). The results of calculation operations are memorized in a characteristic value memory 16 shown in FIG. 1.

A mismatch degree calculating means is denoted by 18, and calculates to find the mismatch degree A from the equation of $A = \epsilon | d - d' | \oplus$ by adding the absolute values of the differences between the characteristic values d of respective blocks of the templet image t and the characteristic values d' of respective blocks in the position (u, v) of the image h to be read for all blocks (Step 110).

Comparator means for comparing the thus calculated mismatch degree A with a pre-set value is denoted by 20. In the illustrated embodiment, the pre-set value is the minimum mismatch degree $A_0$. The comparator means 20 compares the mismatch degree with a properly pre-set value (Step 112), and the image is shifted when the mismatch degree A is more than the pre-set value (Step 114) whereas the mismatch degree A is substituted by the minimum mismatch degree $A_0$ when the mismatch degree A is less than the pre-set value (Step 116). These procedures are repeated for all image zones (Step 118). At every time when the minimum mismatch degree $A_0$ is replaced, the new minimum mismatch degree $A_0$ is memorized in a minimum mismatch degree memory 22 and the address thereof is memorized in an address memory 24. Then, an image shifting means read out the next zone from the frame memory 12 so that similar operations as described above are repeated for all image zones. As the result, the address where the mismatch degree A takes the minimum value $A_0$ can be known from the memory 24 for each of entire image area, and the zones identified by such addresses are defined as the matching zones (Step 120).

However, since it is necessary to find the mismatch degrees for the entire image area in this embodiment, increase in processing speed is of course limited.

Figure 5:
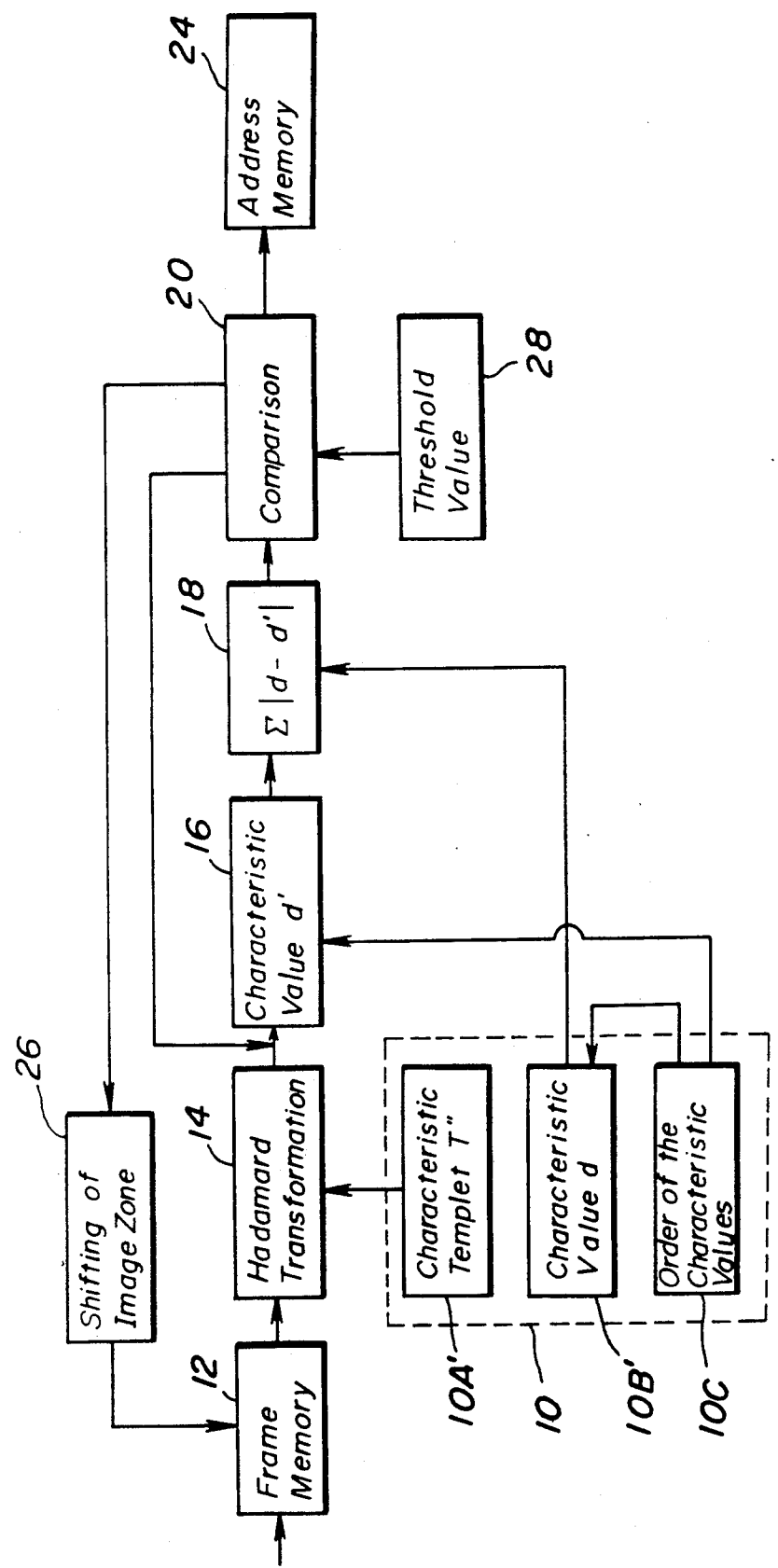
FIG. 5 is a block diagram showing the function of another embodiment of the device according to this invention.

FIG. 5 is a block diagram showing the function of another embodiment of the device according to this invention, by which the image processing speed can be further increased. In this second embodiment, a characteristic templet memory 10A' memorizes only the frequency component which gives the maximum Hadamard coefficient among all frequency components, except the D.C. components, for every block, and a characteristic value memory 10B' memorizes only the Hadamard coefficient (characteristic value d) which gives the maximum absolute value for every block. An order memory 10C memorizes the order of the characteristic values d for every block in the order from the maximum value. Initially, the mismatch degree $A_1 = |d - d'|$ is calculated for the block having the maximum characteristic value, and the thus calculated mismatch degree $A_1$ is compared with a threshold value Th set by threshold value setting means 28.

In the case where $A_1 > Th$, the examined block is judged as a mismatching block, and a further examination is conducted for another block.

On the contrary, in the case where $A_1 < Th$, the mismatch degree $A_2$ is calculated for the block having the second largest characteristic value, and then the sum of $A_1 + A_2$ is compared with the threshold value Th. In the case where $A_1 + A_2 > Th$, it is judged that the block is a mismatching block.

By comparing the mismatch degree A with a pre-set threshold value, the mismatching block can be discriminated rapidly without the need of conducting calculation for entire image area to increase the processing speed considerably.

As will be understood from the foregoing, since the image to be read and the templet image are subjected to Hadamard transformation and the mismatch degree is calculated using maximum one or plural Hadamard coefficients of both images, except the D.C. components, according to this invention, the image processing operations can be accomplished with high accuracy without being affected by the influence caused by the fluctuation of illumination intensity. In addition, high speed processing can be realized since the calculation operation necessary for the image processing are extremely decreased in number. According to the second embodiment in which the maximum one or more differences in Hadamard coefficients are added for respective blocks to judge that the blocks are mismatching when the added value becomes larger than a pre-set threshold value, the necessary calculation operations are further decreased to increase the processing speed.

The present invention further provides an image processing device adapted for use to implement the method of this invention.

Although the invention has been described with reference to presently preferred embodiments, many modifications and variations may be conceived within the spirit and scope of the invention as defined in the appended claims. It is intended to include all such modifications and variations within the scope of the invention.

What is claimed is:

1. In a pattern matching image processing method wherein a matching zone in which an image to be read is matched with a templet image is searched and determined, an improvement which comprises the steps of:
   (a) subjecting a plurality of predetermined picture element areas of said templet image, as blocks, to Hadamard transformation;
   (b) finding a frequency component of each of a plurality of said blocks giving the maximum absolute Hadamard coefficient value among all frequency components except the D.C. component of each block to find a characteristic templet which has the thus found frequency components as block elements thereof;
   (c) taking the Hadamard coefficient of said frequency component giving the maximum absolute Hadamard coefficient value as the characteristic value d of each block;
   (d) finding the characteristic value d' for all blocks of said image to be read while using said characteristic templet;
   (e) adding the differences of the characteristic values of all images to be read from the characteristic value of the templet to define that the mismatch degree A is represented by $A = \epsilon |d - d'|$; and
   (f) determining the matching zone to be the zone at which the mismatch degree assumes a minimum value.

2. In a pattern matching image processing method wherein a matching zone in which an image to be read is matched with a templet image is searched and determined, an improvement which comprises the steps of:
   (a) subjecting a plurality of predetermined picture element areas of said templet image as a plurality of blocks to Hadamard transformation;
   (b) finding the frequency component giving the maximum absolute Hadamard coefficient value among all frequency components of each block except the D.C. components to find a characteristic templet which has the thus found frequency component as a block element thereof;
   (c) taking the Hadamard coefficient of said frequency component giving the maximum absolute Hadamard coefficient value as the characteristic value d of each of the blocks;
   (d) finding the characteristic value d' for all blocks of said image to be read while using said characteristic templet;
   (e) adding the respective differences between the characteristic values of said templet and the characteristic values of said image for the blocks to be read in the order such that the absolute values of said characteristic values d of said templets are larger;
   (f) comparing the results of the addition of the preceding step at every adding operation with a preset threshold value to define that the read image zone is not a matching zone when the result of addition is larger than said threshold value; and
   (g) selecting the read image zone giving the minimum added value among all of the read image zone as which give the added values lower than said threshold value and defining the thus selected zone as the matching zone.

3. In an image processing device for processing an image through a pattern matching image processing method wherein a matching zone in which the image to be read is matched with a templet image is searched and determined, an improved device which comprises:

a characteristic templet memory for memorizing a characteristic templet which has, as elemental components thereof, the frequency component giving the maximum absolute Hadamard coefficient value among the frequency components except the D.C. component for each area of said templet image;

a characteristic value memory for memorizing the Hadamard coefficient of each of the frequency components having the maximum absolute value as the characteristic value d;

Hadamard transformer means for transforming said image to be read using said characteristic templet;

an additional memory for memorizing the Hadamard coefficients transformed by said transformer means as the characteristic quantity d′;

mismatching degree calculating means for calculating a mismatch degree $A = \epsilon |d - d'|$ by adding the absolute values of differences in characterized values of the templet and the image to be read; and comparator means for comparing said mismatch degree with a pre-set value to judge that the zone is a matching zone when said mismatch degree is not more than said pre-set value.

4. In an image processing device for processing an image through a pattern matching image processing method wherein a matching zone in which the image to be read is matched with a templet image is searched and determined, an improved device which comprises:

a characteristic templet memory for memorizing a characteristic templet which has, as elemental components thereof, the frequency component giving the maximum absolute Hadamard coefficient value among the frequency components except the D.C. component for each area of said templet image;

a characteristic value memory for memorizing the Hadamard coefficient of each of the frequency components having the maximum absolute value as the characteristic value d and simultaneously memorizing at least the area giving the maximum absolute value;

Hadamard transformer means for transforming said image to be read using said characteristic templet;

calculator means for calculating and adding the absolute values of the differences in characteristic values of the templet and of the image to be read in the order from the area which assumes the maximum characteristics value; and comparator means for comparing the sum obtained by said calculator with a pre-set threshold to judge that the image is mismatched when said sum is more than said pre-set threshold.

* * * * *